United States Patent
Toback et al.

(10) Patent No.: US 9,256,746 B2
(45) Date of Patent: Feb. 9, 2016

(54) DEVICE AND METHOD FOR REMEDIATING VULNERABILITIES

(71) Applicant: VMware, Inc., Palo Alto, CA (US)

(72) Inventors: Michael Ira Toback, Saratoga, CA (US); David Ferguson, Mountain View, CA (US); Maria del Carmen Hernandez-Villavicencio, Menlo Park, CA (US); Wenfeng Liu, Beijing (CN); Monty Ijzerman, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 13/716,038

(22) Filed: Dec. 14, 2012

(65) Prior Publication Data

US 2014/0173737 A1 Jun. 19, 2014

(51) Int. Cl.
*G06F 21/57* (2013.01)

(52) U.S. Cl.
CPC ............. *G06F 21/577* (2013.01); *G06F 21/57* (2013.01)

(58) Field of Classification Search
CPC ..... G06F 21/57; G06F 21/128; G06F 21/577; H04L 63/1433
USPC .................................................... 726/22–25
See application file for complete search history.

(56) References Cited

U.S. PATENT DOCUMENTS

| | | | |
|---|---|---|---|
| 7,451,488 B2 * | 11/2008 | Cooper ................. | H04L 63/102 726/2 |
| 8,132,260 B1 | 3/2012 | Mayer et al. | |
| 8,321,944 B1 * | 11/2012 | Mayer et al. ..................... | 726/25 |
| 2004/0015728 A1 * | 1/2004 | Cole .................... | G02B 5/3083 726/23 |
| 2004/0019803 A1 * | 1/2004 | Jahn ...................... | G06F 21/577 726/25 |
| 2005/0138413 A1 * | 6/2005 | Lippmann et al. ............. | 713/201 |
| 2005/0160286 A1 * | 7/2005 | Currie .................. | G06F 21/577 726/22 |
| 2005/0283834 A1 * | 12/2005 | Hall et al. ......... | 726/24 |
| 2006/0259974 A1 * | 11/2006 | Marinescu et al. ............ | 726/25 |
| 2007/0169199 A1 | 7/2007 | Quinnell et al. | |
| 2008/0201780 A1 * | 8/2008 | Khan et al. ...................... | 726/25 |
| 2009/0077666 A1 | 3/2009 | Chen et al. | |
| 2009/0248869 A1 * | 10/2009 | Ghostine ....................... | 709/225 |
| 2011/0047597 A1 * | 2/2011 | Mahaffey et al. ................ | 726/3 |
| 2011/0126111 A1 | 5/2011 | Gill et al. | |
| 2011/0131656 A1 | 6/2011 | Haviv et al. | |
| 2011/0231936 A1 * | 9/2011 | Williams et al. ................ | 726/25 |
| 2012/0174230 A1 * | 7/2012 | Hoyt .............................. | 726/25 |
| 2012/0304300 A1 * | 11/2012 | LaBumbard .......... | G06F 21/577 726/25 |
| 2013/0074188 A1 * | 3/2013 | Giakouminakis ..... | G06F 21/577 726/25 |
| 2013/0097711 A1 * | 4/2013 | Basavapatna ........... | H04W 4/02 726/25 |
| 2013/0247205 A1 * | 9/2013 | Schrecker ............. | G06F 21/577 726/25 |
| 2014/0189873 A1 * | 7/2014 | Elder et al. ...................... | 726/25 |

\* cited by examiner

OTHER PUBLICATIONS

Enterprise Application Security Software, Assess Exposure to Risk, Palamida, downloaded at: www.palamida.com/products/enterpriseedition/assess_exposure_to_risk, Oct. 25, 2012, 1 page.
Enterprise Application Security Software, Feature Set, Palamida, downloaded at: www.palamida.com/products/enterpriseedition/feature_set, Oct. 25, 2012, 2 pages.
Palamida Enterprise Edition 6, DataSheet, www.palamida.com, downloaded Oct. 25, 2012, 4 pages.
Palamida: Enterprise Edition Integration with IBM Rational ClearCase, Product Brief, www.palamida.com, 2009, 2 pages.

*Primary Examiner* — Hadi Armouche
*Assistant Examiner* — Sher A Khan
(74) *Attorney, Agent, or Firm* — Nicholson De Vos Webster & Elliott LLP (57) ABSTRACT

Exemplary methods, apparatuses, and systems receive data describing a first software component used by a software product and vulnerability data describing a vulnerability in the first software component. A vulnerability score is calculated for the software product based upon the vulnerability data for the first software component. The vulnerability score is recalculated for the software product based upon receiving an updated status of the vulnerability in the first software component from bug tracking software, a waiver of the vulnerability of a software component, the addition of another software component, or another update to the software product or component(s). The task of remediation of the vulnerability in the first software component can be assigned to a user and tracked. A user interface is provided to enable users to monitor the vulnerabilities of software products or components.

16 Claims, 7 Drawing Sheets

Vulnerability Tracking    Browse    My Products    My Tasks

Assigned Tasks    Accept | Reassign | Reject    405

| Vuln ID | Risk Score | Assignee | Assignor | Component | Product |
|---|---|---|---|---|---|
| CVE-2002-0012 | 8.5 | mtoback | kxu | Component C | Product Z |

Active Tasks    Create/Associate a Bug | Reassign | Waiver    410

| Vuln ID | Risk Score | Owner | Component | Product |
|---|---|---|---|---|
| CVE-2002-1234 | 10.0 | mtoback | Component B | boomerang |
| CVE-2008-1234 | 4.3 | mtoback | Component B | boomerang |

Open Bugs    415

| Bug ID | Vuln ID | Owner | Risk score | Component |
|---|---|---|---|---|
| 1234567 | CVE-2003-5234 | mtoback | 8.3 | Component A |
| 0987654 | CVE-2008-6352 | mtoback | 9.5 | Component B |

Vulnerability Tracking   Browse   My Products   My Tasks

Open Bugs                                                                415

| Bug ID   | Vuln ID        | Owner   | Risk score | Component   |
|----------|----------------|---------|------------|-------------|
| 1234567  | CVE-2003-5234  | mtoback | 8.3        | Component A |
| 0987654  | CVE-2008-6352  | mtoback | 9.5        | Component B |

Open Waviers   Withdraw | Reassign | Approve | Reject              420

| Vuln ID        | Risk Score | Assignee | Owner   | Assignor | Component   | Product   |
|----------------|------------|----------|---------|----------|-------------|-----------|
| CVE-2007-3508  | 7.2        | none     |         | mtoback  | Component C | Product Z |

Completed Tasks   Reopen                                           425

| Vuln ID        | Risk Score | Owner   | Component   | Product   |
|----------------|------------|---------|-------------|-----------|
| CVE-2008-3245  | 10.0       | mtoback | Component B | boomerang |

DEVICE AND METHOD FOR REMEDIATING VULNERABILITIES

FIELD OF THE INVENTION

The various embodiments described herein relate to detecting, tracking, and remediating software vulnerabilities within components used by software products as the software products are developed or maintained.

BACKGROUND OF THE INVENTION

A software vulnerability is a weakness in a software component or product that allows an attacker to use the software component or product in a manner that was not intended, e.g., to reduce a processing system's ability to secure data and expose confidential information. Software developers often build software products using software components that are tracked for vulnerabilities by third-party agencies such as the U.S. National Institute of Standards and Technology, which maintains the National Vulnerability Database, a repository of standards-based vulnerability management data and enables vulnerability management, security measures, and compliance.

When a software developer determines that a software component that he has used in a software product contains a vulnerability, he may choose to fix or remediate the vulnerability by patching the software component, using an updated revision of the component, or making other changes to the software component or product to lessen or remove the vulnerability.

SUMMARY OF THE INVENTION

Exemplary methods, apparatuses, and systems receive data describing a first software component used by a software product and vulnerability data describing a vulnerability in the first software component. A vulnerability score is calculated for the software product based upon the vulnerability data for the first software component. The vulnerability score is recalculated for the software product based upon receiving an updated status of the vulnerability in the first software component from bug tracking software, a waiver of the vulnerability of a software component, the addition of another software component, or an update to the software product or component(s). The task of remediation of the vulnerability in the first software component can be assigned to a user and tracked. A user interface is provided to enable users to monitor the vulnerabilities of software products or components.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein detect, track, and remediate vulnerabilities within software products. The exploitation of software vulnerabilities can cause harm to the software product including the vulnerability, to the system in which the software product runs, to other processing systems, etc. The ability to detect, track, and remediate vulnerabilities helps the developer of the software product protect against risks associated with software vulnerabilities, including customer goodwill.

Figure 1:
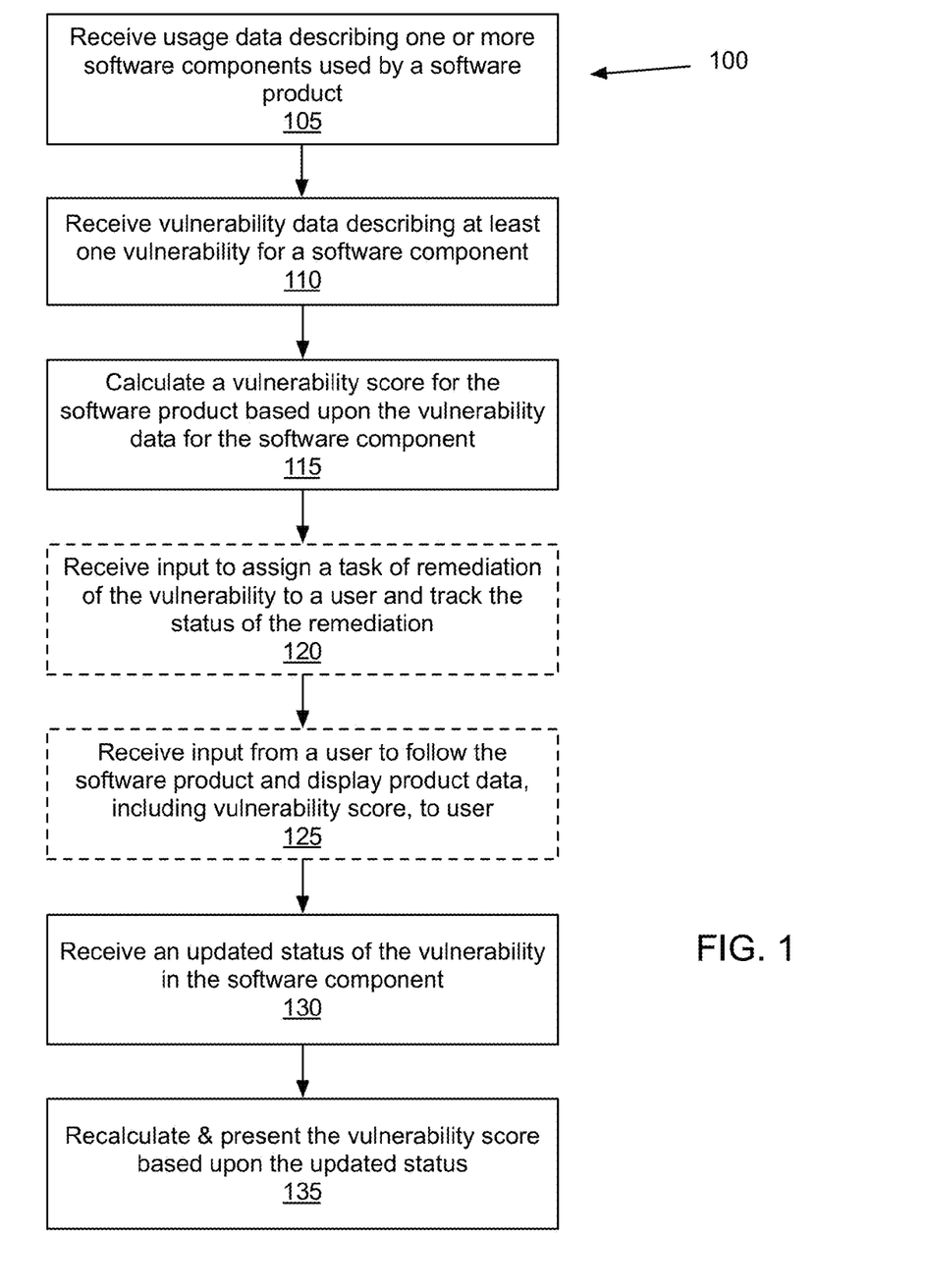
FIG. 1 is a flow chart of an exemplary method of detecting, tracking, and remediating software vulnerabilities.

FIG. 1 is a flow chart of an exemplary method 100 of detecting, tracking, and remediating software vulnerabilities performed by one or more processing systems. For the ease of description, features of the method 100 will be described as being performed by a computer or the computer. One or more of the features of the method 100, however, may be performed by different or multiple computers.

At block 105, the computer receives usage data describing one or more software components to be used by a software product. For example, the computer may receive input indicating that an open source software component that extends server functionality is to be used by a hypervisor software product. As used herein, a software component includes, but is not limited to, a portion of software, software module, software package, web service, or software application. As used herein, "used by a software product" includes, but is not limited to, software code incorporated within the software product and/or software used by/with the software product. For example, a web browser application run on a virtual machine is a software component (web browser) used with a software product (virtual machine).

In one embodiment, the computer collects this usage data by way of user input. Alternatively, the computer receives the usage data by accessing a database, performing build analysis, or performing a source code scan. In one embodiment, a component tracking system maps usage of components to software products, e.g., maintaining a usage database to determine which might require licensing considerations. In such an embodiment, the computer accesses the usage database to receive the data describing one or more software components to be used by a software product.

At block 110, the computer receives vulnerability data describing at least one vulnerability for the one or more software components to be used by the software product. In one embodiment, vulnerabilities are received from an external vulnerability repository. For example, the National Institute of Standards and Technology (NIST) maintains a National Vulnerability Database to track vulnerabilities in software components. Alternatively, vulnerabilities are received by way of user input or an internal database. The vulnerability data includes a vulnerability score for each vulnerability that indicates the severity of the vulnerability. For example, the Common Vulnerability Scoring System (CVSS) provides an open framework for communicating the characteristics and impacts of vulnerabilities in which vulnerabilities are ranked on a scale of 0.0 to 10.0. Vulnerabilities are labeled low severity if they have a CVSS base score of 0.0-

3.9, medium severity if they have a base CVSS score of 4.0-6.9, and high severity if they have a CVSS base score of 7.0-10.0. Each component tracked by the vulnerability database may include one or more vulnerabilities, each with its own score/ranking.

At block 115, the computer calculates, or otherwise determines, a vulnerability score for the software product based upon the vulnerability data for the software component. In one embodiment, the vulnerability score for the software product is set to the highest vulnerability score of the components used by/to be used by the software product. For example, if the software product includes three components, each with one vulnerability and corresponding vulnerability scores of 2.2, 5.5, and 9.8, the vulnerability score for the software product would be determined to be 9.8. Alternatively, the vulnerability score for the software product is calculated as an average or mean of all or a portion of the vulnerability scores for the components used by the software product. If only a single component vulnerability is known for a given software product, the vulnerability score for the software product is set to the score for the single component's vulnerability.

In one embodiment, the vulnerability score for a software product reflects the vulnerability score for a particular version of the software product. For example, the 1.0 and 1.1 versions of a software product may have different vulnerability scores. Alternatively, or additionally, the vulnerability score may reflect multiple versions of a software product, e.g. all versions of a product.

The vulnerability scores for software products, components, and individual vulnerabilities are presented in one or more graphical user interfaces, as described with reference to FIGS. 2-4.

At block 120, the computer optionally receives input to assign the task of remediating the vulnerability to a user. As described further with reference to FIG. 4, the computer presents the assignee of the task with the option to accept the task, reject the task, or assign the task to another user and, once accepted by a user, the status of the remediation process may be tracked in a graphical user interface tailored to tasks for which the user is responsible.

At block 125, the computer optionally receives input from a user to follow the software product, component, or vulnerability. In response, the computer presents the software product, component, or vulnerability in a graphical user interface, along with any other software product, component, or vulnerability the user follows, and their corresponding vulnerability scores. Following a software product, component, or vulnerability will be described in greater detail with respect to FIG. 3.

At block 130, the computer receives an updated status of the vulnerability for the software component. An updated vulnerability score from the vulnerability database, remediation of the vulnerability, or an indication that the software component is no longer to be included in the software product results in the updated status. An updated vulnerability score from the vulnerability database includes an entry for the vulnerability in the vulnerability database changing from one score to another, e.g., due to an updated estimation of the potential risk.

Remediation of the vulnerability includes a approval of a waiver for the vulnerability, bug resolution or updated bug status, or modifying the software component or software product—e.g., patching, debugging the software component, or using a different component to eliminate or lessen the vulnerability, modifying the software product to limit the use of the software component, etc. For example, an updated bug status may indicate that the vulnerability has been patched or that the software component has been debugged or otherwise revised. In one embodiment, remediation is performed on a specific instance of the vulnerability on a specific component within a specific product. Alternatively, the remediation is performed for all instances of usage of a specific component or anywhere the vulnerability is detected.

In one embodiment, the updated vulnerability status is received from bug tracking software or a database maintained by bug tracking software. For example, Bugzilla is a software tool designed to help manage software development in the discovery, tracking, and remediation of bugs. As will be described with reference to FIG. 4, a vulnerability may be associated with a bug in the bug tracking software and, once the bug is addressed, the status of the vulnerability is updated based upon the tracked bug.

At block 135, the computer recalculates the vulnerability score for the software product based upon the updated status of the vulnerability in the software component. For example, if the vulnerability in the software component has been waived or if the software component is removed from the software product, the vulnerability score for the software component is removed from the calculation of the vulnerability score for the software product. Similarly, if the vulnerability score for the software component has changed due to a vulnerability database change or remediation effort (including a successful debugging, reducing the software component's vulnerability score to a lesser value/zero), the software product's vulnerability score is recalculated. Calculation of the vulnerability score for a software product is described above with reference to block 115.

Figure 2:
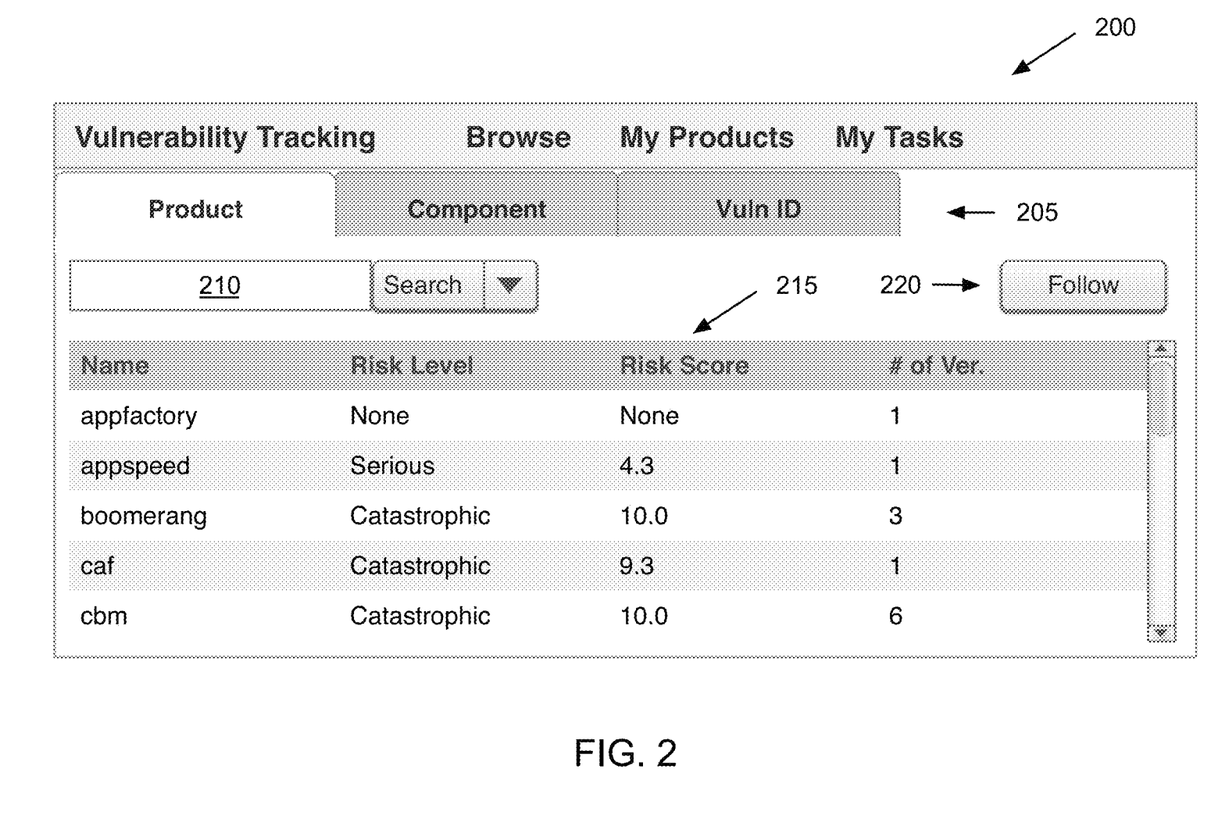
FIG. 2 illustrates an exemplary graphical user interface enabling a user to browse through software vulnerabilities.

FIG. 2 illustrates an exemplary graphical user interface (GUI) 200 enabling a user to browse through software vulnerabilities. The GUI 200 provides a user with the ability to search one or more databases by software product, by software component, or by vulnerability identifier, e.g., under three different tabs 205 of the GUI 200. Search terms are entered into the search input box 210. Search results are displayed in a results window 215, including the name, risk level, risk score, and/or number of versions. Risk levels corresponding to low, medium, and high severity were discussed above. Alternatively, risk levels may be labeled none/no risk, serious, catastrophic, etc. Risk levels are a function of the risk score. In one or more embodiments, the risk levels are calculated as one or more ranges of risk score.

In one embodiment, when multiple search terms are entered in the search input box 210, each search term is utilized differently. For example, the first one or more search terms are used in the search for the name of a product/component while the subsequent search term is used in the search for a version number of said product/component. In one embodiment, a vendor name may be used as a specific search term as well. In one or more embodiments, a user searches for a vulnerability using some combination of vulnerability identifier, vendor, product and version associated with the used component.

In one embodiment, an entire list of products/components/vulnerabilities is shown in results window 215 prior to a search and filtered results are shown after a search term is entered. For example, when using the software product tab 205, all products are displayed in the results window 215 and a filtered list based upon any search term(s) entered in the search box 210 would be displayed upon entering the search. Alternatively, the results window 215 displays nothing until a search is entered.

In one embodiment, entries in the results window 215 are selectable. For example, a user may select a software product in results window 215 and select the follow button 220 to track vulnerabilities for the selected product. Additionally, user selection of an entry in the results window 215 may result in expanding the results window, or opening a separate window (e.g., as described with reference to FIG. 3), to display additional detail. For example, user selection of a software product in the results window 215 may result in the display of one or more of: various versions of the software product, software components used by the product, vulnerabilities identified within the software product, a narrative description of the software product, notes regarding vulnerabilities, alternative software components/versions for included software components with vulnerabilities, assigned tasks related to the selected software product, etc.

In one embodiment, the GUI 200 includes a button, link, drop-down menu, file upload menu, or other way to indicate that a software component is be used by a software product. In one embodiment, the GUI 200 includes a button, link, drop-down menu, file upload menu, or other way to enable a user or the computer to map a software component identifier (e.g., defined locally) to a software component identifier as defined in the vulnerability database(s) used. For example, the local identifier for the component commonly referred to as "Tomcat 7.0" might be a tuple (name="apache-tomcat", version="7.0") while the identifier in the National Vulnerability Database is "apache:tomcat:7.0." For example, user selection of a software product in the results window 215 enables the user to enter or update the mapping of a software component to be included in the selected software product. Similarly, user selection of a software component in the results window 215 enables the user to enter a software product or update a mapping that will include the selected software component. Either way, user input indicating that a software component is be used by a software product or mapping between software component identifiers is a way in which the computer performs block 105 described above with reference to FIG. 1.

Figure 3:
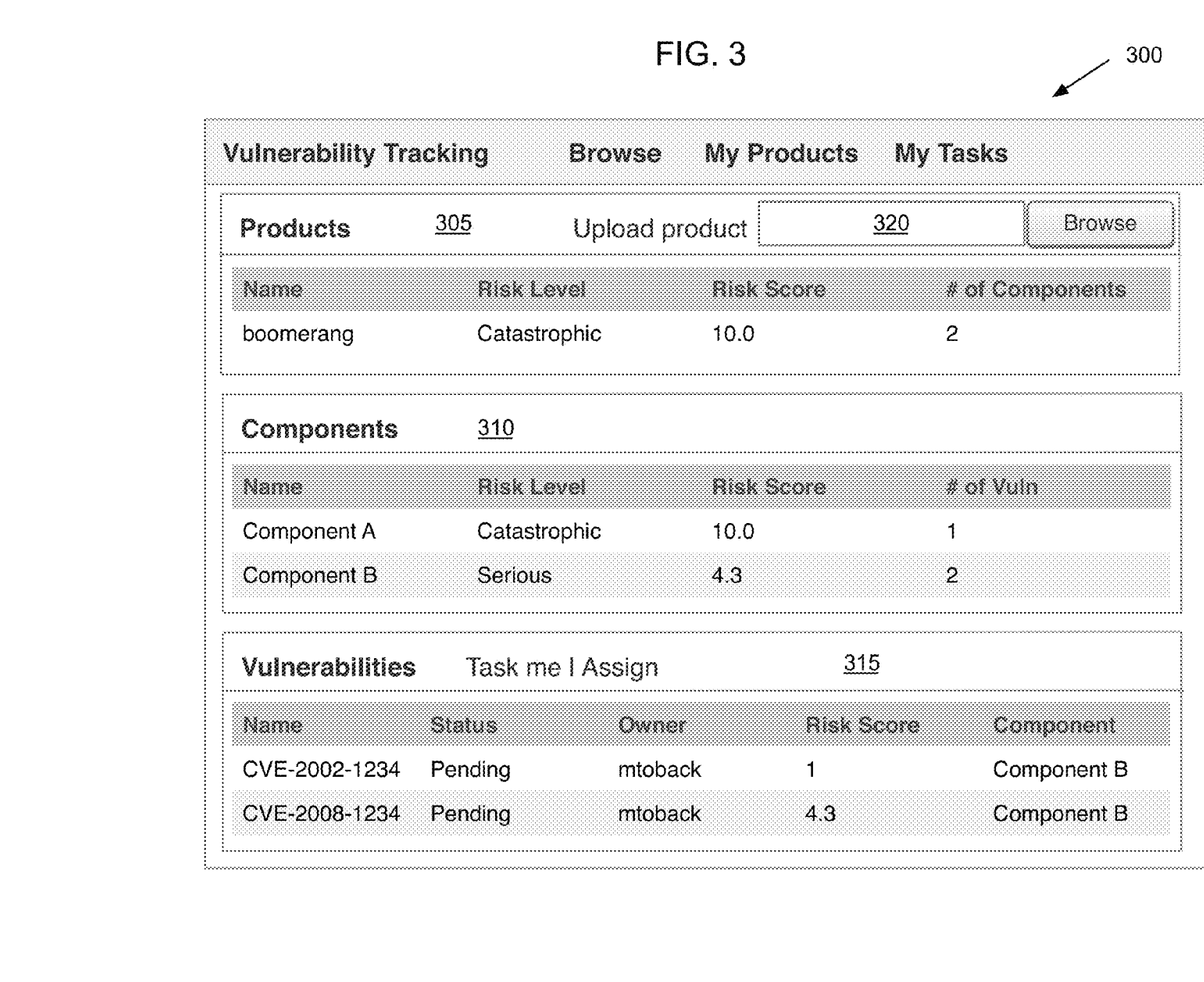
FIG. 3 illustrates an exemplary graphical user interface enabling a user to detect, track, and remediate software vulnerabilities.

FIG. 3 illustrates an exemplary GUI 300 enabling a user to detect, track, and remediate software vulnerabilities. The GUI 300 includes sub-windows for products 305, components 310, and vulnerabilities 315. In one embodiment, one or more of the sub-windows 305/310/315 is displayed in response to selection of a software product, software component, or vulnerability in the GUI 200 described above to enable the user to follow a product or component or to assign the task of remediating a vulnerability to a user.

Additionally, or alternatively, one or more of the sub-windows 305/310/315 displays one or more software products, software components, or vulnerabilities that a user is following. For example, the user may be a part of a development team for, or otherwise interested in, the software product boomerang. The sub-window for products 305 displays the name of the product, boomerang, the calculated risk level and score, and the number of components used by boomerang. The upload product input box 320 enables a user to enter or search for a product to follow.

In one embodiment, selection of a software product in the products sub-window 305 results in the display of all of the components used by the software product. Alternatively, selection of the software product in the products sub-window 305 results in the display of the components used by the software product and that the user is following. In GUI 300, Component A and Component B in the components sub-window 310 represent the two components included in boomerang. The components sub-window 310 includes the name, risk level, risk score, and number of vulnerabilities associated with each software component.

As described above, in one embodiment, the risk score for a software product is calculated as being the highest risk score of the components used by the software product. Component A's risk score of 10.0 is greater than Component B's risk score of 4.3, therefore the risk score for boomerang is calculated to be 10.0.

In one embodiment, selection of a software component in the components sub-window 310 results in the display of the vulnerabilities associated with the selected software component. For example, CVE-2002-1234 and CVE-2008-1234 in sub-window 315 are the identifiers for two vulnerabilities associated with Component B. The vulnerabilities sub-window 315 includes the name, remediation status, owner of the task to remediate the vulnerability (if assigned), risk score, and corresponding software component. In one embodiment, the user can add the task of remediating a vulnerability to her own set of tasks or assign the task of remediating the vulnerability to another user by selecting a vulnerability and the corresponding button, link, menu option, or command.

Similar to the description above, in one embodiment, the risk score for a software component with multiple vulnerabilities is calculated as being the highest risk score of the associated vulnerabilities. CVE-2002-1234's risk score of 1.0 is less than CVE-2008-1234's risk score of 4.3, therefore the risk score for Component B is calculated to be 4.3.

In one embodiment, selection of a vulnerability results in the presentation of additional detail. For example, additional detail may include a description of the vulnerability, a description of remediation efforts, an alternative software component/version, a date the task of remediating the vulnerability was assigned, etc. In one embodiment, the computer presents a recommended alternative to the selected software component based upon the vulnerability data describing the vulnerability in the first software component. For example, the computer may determine that a known alternative component has a lower vulnerability score than the currently used software component.

In one embodiment, a user elects or automatically receives notifications regarding a product/component/vulnerability that the user is following. For example, if the vulnerability score for the software component boomerang changes or if the assignment status of a task changes, the computer generates a notification for the user. Alternatively, the computer generates a notification if a vulnerability score exceeds or falls below a default or user-specified threshold value. The notification may be presented to the user in GUI 300 or in another context, e.g., in an email or other electronic message.

Figure 4A:
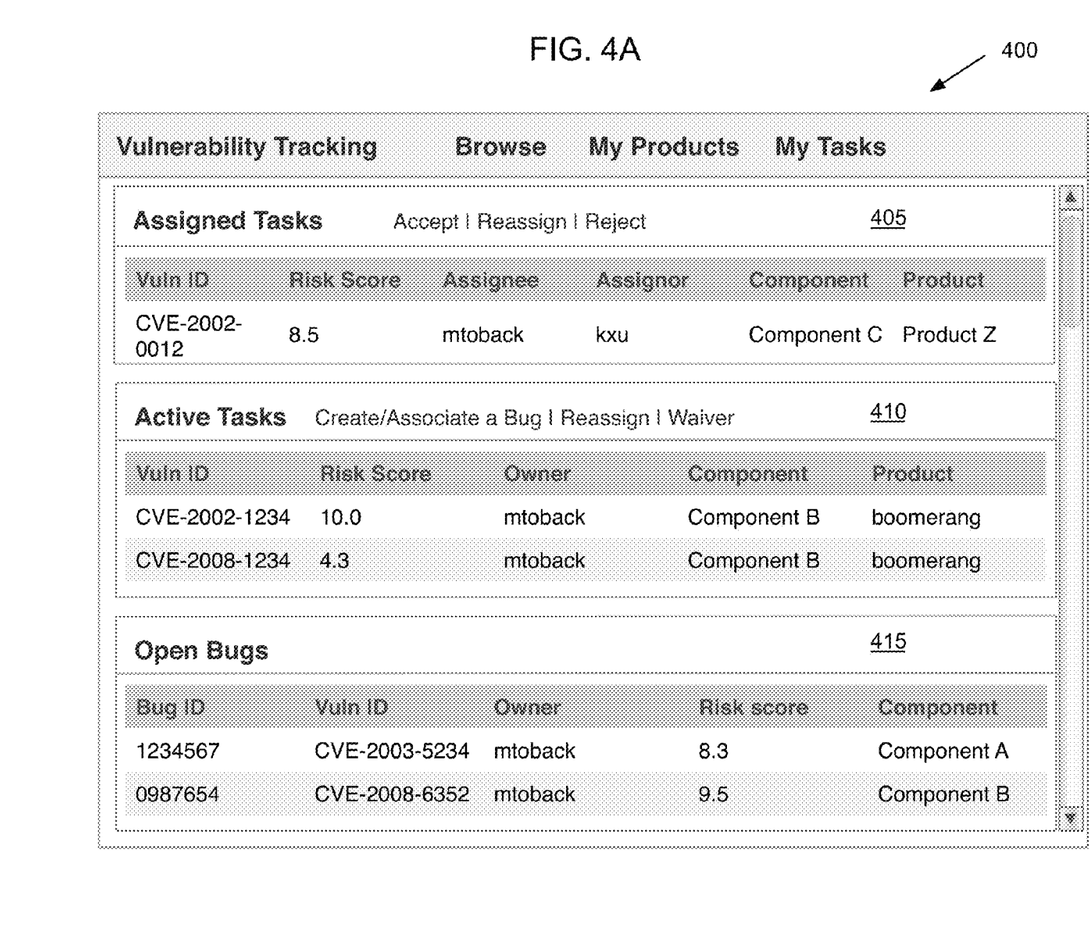
FIG. 4A illustrates another exemplary graphical user interface enabling a user to detect, track, and remediate vulnerabilities.

FIG. 4A illustrates another exemplary GUI 400 enabling a user to detect, track, and remediate vulnerabilities. FIG. 4B illustrates additional content of the GUI 400 of FIG. 4A, as indicated by the scroll bar control on the right portion of the GUI 400 being at the top of the scroll bar in FIG. 4A and at the bottom of the scroll bar in FIG. 4B. The GUI 400 includes sub-windows for assigned tasks 405, active tasks 410, open bugs 415, open waivers 420, and completed tasks 425.

The assigned tasks sub-window 405 lists tasks that have been assigned to the user. Assigned tasks include one or more of a vulnerability identifier, a risk score, a risk level, an assignee, an assignor, a software component that includes the vulnerability, and a software product in which the software component is included. Similar to the description above, user selection of vulnerability within the assigned tasks results in the computer presenting additional detail regarding the vulnerability. Additionally, the user may select an assigned task and accept the task, reassign the task to another user, or reject the task (sending the task back to the assignor to reassign).

The active tasks sub-window 410 lists tasks that the user has accepted or assigned to herself. Active tasks include one or more of a vulnerability identifier, a risk score, a risk level, an owner/assignee, an assignor, a software component that includes the vulnerability, and a software product in which the software component is included. Similar to the description above, user selection of vulnerability within the assigned tasks results in the computer presenting additional detail regarding the vulnerability. For example, in response to user selection of an active task, the computer may present an alternative software component or version of the software component within the active task. The user, in response, has the option of replacing the vulnerable software component with the presented alternative component/version.

Additionally, the user may create a new bug or associate an existing bug with a selected active task, reassign the selected active task, or request a waiver for the selected active task. Creating/associating a bug is type of remediation effort for a vulnerability. In response to a create/associate a bug input, the computer associates the vulnerability with a new or existing bug in an internal/external bug tracking tool. The vulnerability tracking and remediation system described herein monitors data generated by bug tracking tool during the effort to remediate vulnerabilities via debugging/patching. Reassigning a selected active task is similar to reassigning an assigned task. The user selects another user to receive the task for remediation of the corresponding vulnerability. Furthermore, the user may remediate the vulnerability by requesting a waiver rather than debugging/patching the software component. A waiver request is, in response to user selection of an active task and waiver request button, link, menu option, etc., transmitted to a user with the authority to grant permission to include the software component within a software product despite the risk level of the vulnerability.

The open bugs sub-window 415 lists bugs that have been associated with the user's active tasks. For example, once a user has associated an active task with a bug, the task moves from the active tasks sub-window 410 to the open bugs sub-window 415. Open bugs include one or more of a bug identifier (e.g., as identified by a bug tracking tool), vulnerability identifier, a risk score, a risk level, an owner/assignee, an assignor, a software component that includes the vulnerability, and a software product in which the software component is included. User selection of bug/vulnerability within the open bugs sub-window 415 results in the computer presenting additional detail regarding the bug/vulnerability or opening the bug in the bug tracking tool.

The open waivers sub-window 420 lists waivers that have been requested for the user's active tasks. For example, once a user has requested waiver for an active task, the task moves to the open waivers sub-window 420. Open waivers include one or more of a vulnerability identifier, a risk score, a risk level, an owner/assignee, an assignor, a software component that includes the vulnerability, a date the waiver was requested, and a software product in which the software component is included. User selection of vulnerability within the open waivers sub-window 420 results in the computer presenting additional detail regarding the vulnerability or waiver process. Additionally, the user may select an open waiver and withdraw the waiver request or reassign the task. If the user has the authority to approve or reject a waiver, the user may additionally select and approve or reject waiver requests within the open waivers sub-window 420.

The completed tasks sub-window 425 lists tasks that have been completed. For example, bugs that have been resolved or vulnerabilities that have been waived will be listed within the completed tasks sub-window 425. Completed tasks include one or more of a vulnerability identifier, a risk score, a risk level, an owner/assignee, an assignor, a software component that includes the vulnerability, a date the task was completed, and a software product in which the software component is included. User selection of vulnerability within the completed tasks sub-window 425 results in the computer presenting additional detail regarding the remediation of the vulnerability, including how the vulnerability was remediated, when the vulnerability was remediated, etc. Additionally, the user may select a completed task and reopen the selected task. Reopening a task returns the task to the active tasks sub-window 410.

Figure 5:
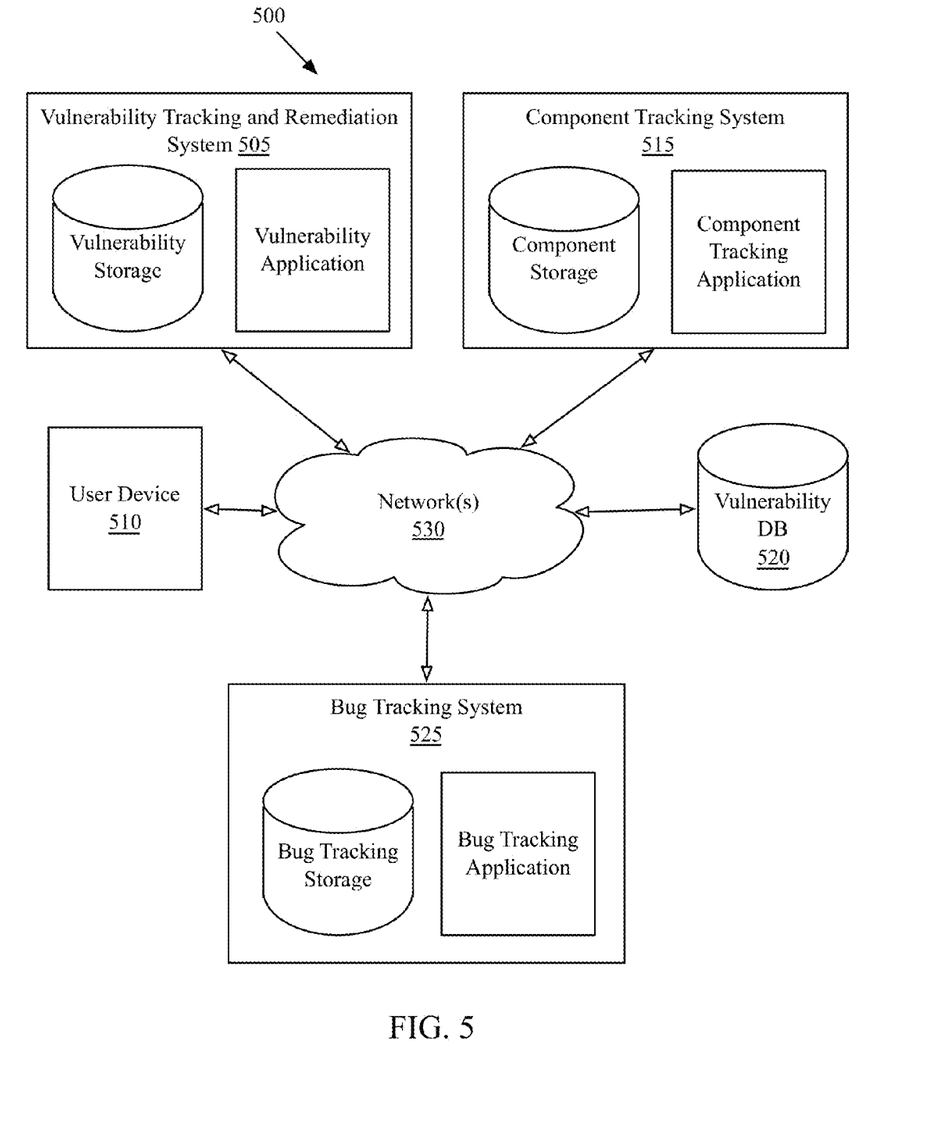
FIG. 5 illustrates, in block diagram form, an exemplary network of one or more systems to detect, track, and remediate software vulnerabilities.

FIG. 5 illustrates, in block diagram form, an exemplary network of one or more systems to detect, track, and remediate software vulnerabilities. A vulnerability tracking and remediation system 505 is coupled to a user device 510, component tracking system 515, vulnerability database 520, and bug tracking system 525 via one or more networks 530. While these systems and devices are illustrated as separate blocks, one or more of the systems or devices may be a part of a single device/processing system.

The vulnerability tracking and remediation system 505 includes vulnerability storage and a vulnerability tracking and remediation application. The vulnerability storage stores vulnerability tracking and remediation data, e.g., as presented in the GUIs 200-400 illustrated in FIGS. 2-4. The vulnerability tracking and remediation application performs the operations described above with reference to FIGS. 1-4.

Figure 4B:
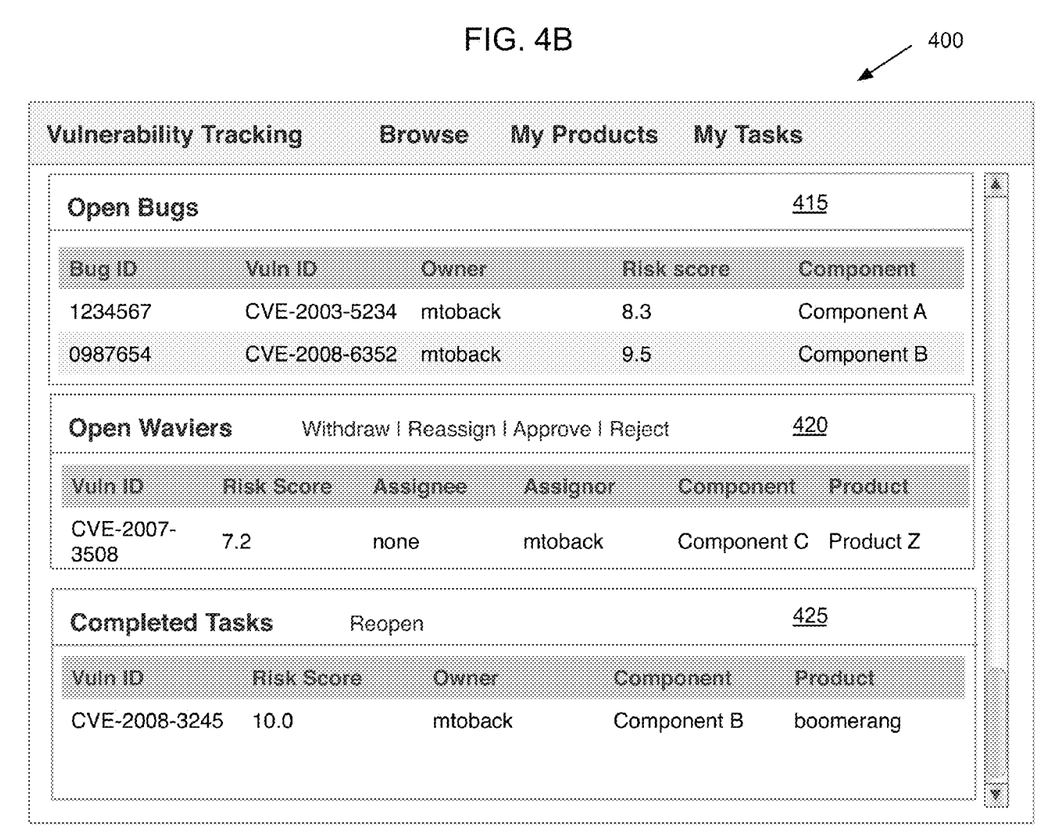
FIG. 4B illustrates additional content of the exemplary graphical user interface of FIG. 4A.

The user device 510 is a processing device that enables a user to access the vulnerability tracking and remediation system and displays the GUIs 200-400 illustrated in FIGS. 2-4. Additionally, the user device 510 facilitates user input to assign a task or track/follow a product/component. In one embodiment, the user device 510 additionally enables the user access the component tracking system 515, vulnerability database 520, and/or bug tracking system 525.

The component tracking system 515 includes component storage and a component tracking application. In one embodiment, the component storage provides a definition of each software product developed, under development, or maintained by an enterprise/developer. Additionally, the component storage includes software components that are used by each of the software products. For example, the component tracking system 515 maps usage of components within software products for licensing considerations and/or remediation of vulnerabilities. In one embodiment, each instance of a software component is tracked separately to enable each software component to be remediated separately by a software patch, component update, waiver, etc., enabling different types of remediation for each instance. For example, in one embodiment and as described with reference to block 105 of FIG. 1, the vulnerability tracking and remediation system 505 receives data describing one or more software components to be used by a software product from the component tracking system 515.

In one embodiment, the vulnerability tracking and remediation system 505 or the component tracking system 515 provides information needed to associate the name of the each component with the names used by one or more vulnerability databases 520. For example, different users may refer to the same software component in a number of different ways. The information for the mapping of software components includes one or more of the software component vendor, component name, and version number in a uniform manner to uniquely and consistently identify each software component and track known vulnerabilities. For example, the NVD identifies a component by its vendor, component name, major component version, minor version, and update. For SWcomponent 6.0.1 produced by VendorName, an exemplary implementation of the stored mapping identifier might be VendorName:SWcomponent:6:0:1. In one embodiment, the system identifies the vendor, component name, and version number and automatically creates the corresponding table entry in the above-described uniform manner. Alternatively, the user creates table entries in the uniform manner.

The vulnerability database 520 stores vulnerability data for software components. In one embodiment the vulnerability database 520 is an externally maintained database, such as the NVD. Alternatively, the vulnerability database 520 is internally maintained, e.g., within an enterprise or by the developer. As described with reference to block 110 in FIG. 1, the vulnerability tracking system 505 receives software component vulnerability information from one or more vulnerability databases 520. For example, the NVD provides XML files including vulnerability data several times a day. The XML files can be parsed for software components used by software products and the corresponding vulnerability data is stored. Alternatively, a user enters vulnerability information directly into a vulnerability database 520 or the vulnerability tracking system 505.

The bug tracking system 525 includes bug tracking storage and a bug tracking application. The bug tracking application is a software application that is designed to help quality assurance and programmers keep track of reported software bugs in software products. The bug tracking storage stores the status of bugs tracked by the bug tracking system. In one embodiment, as described with reference to block 130 in FIG. 1, the vulnerability tracking system 505 receives updates on the status of one or more vulnerabilities from the bug tracking system 525.

Figure 6:
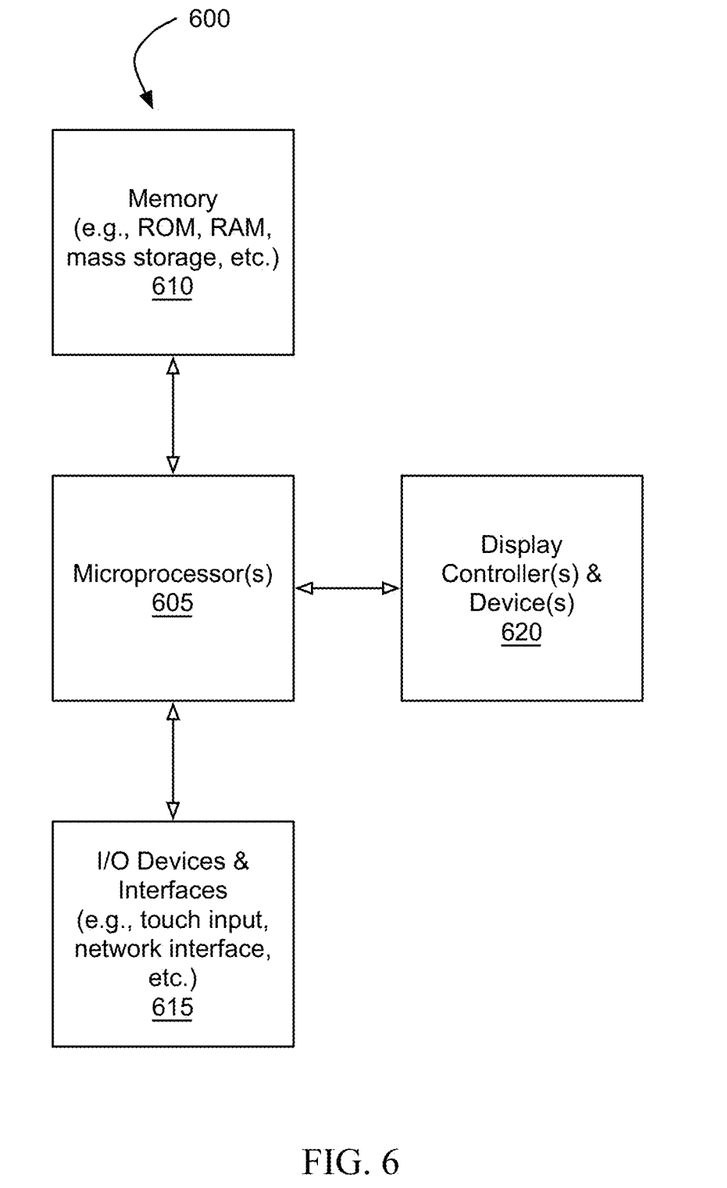
FIG. 6 illustrates, in block diagram form, an exemplary processing system to detect, track, and remediate software vulnerabilities.

FIG. 6 illustrates, in block diagram form, an exemplary processing system 600 to track and remediate software vulnerabilities. Data processing system 600 includes one or more microprocessors 605 and connected system components (e.g., multiple connected chips). Alternatively, the data processing system 600 is a system on a chip.

The data processing system 600 includes memory 610, which is coupled to the microprocessor(s) 605. The memory 610 may be used for storing data, metadata, and programs for execution by the microprocessor(s) 605. The memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 610 may be internal or distributed memory.

A display controller and display device 620 provides a visual user interface for the user. For example, the display controller and display device 620 display/present the GUIs 200-400 to the user.

The data processing system 600 also includes one or more input or output ("I/O") devices and interfaces 625, which are provided to allow a user to provide input to, receive output from, and otherwise transfer data to and from the system. These I/O devices 625 may include a mouse, keypad or a keyboard, a touch panel or a multi-touch input panel, optical scanner, network interface, modem, other known I/O devices or a combination of such I/O devices.

The I/O devices and interfaces 625 may also include a connector for a dock or a connector for a USB interface, FireWire, Thunderbolt, Ethernet, etc. to connect the system 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect the data processing system 600 with another device, external component, or a network and receive stored instructions, data, tokens, etc.

It will be appreciated that one or more buses, may be used to interconnect the various components shown in FIG. 6.

The data processing system 600 is an exemplary representation of one or more of the vulnerability tracking and remediation system 505, the user's device 510, the component tracking system 515, or the bug tracking system 525. The data processing system 600 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices. In other embodiments, the data processing system 600 may be a network computer, server, or an embedded processing device within another device or consumer electronic product. As used herein, the terms computer, system, device, processing device, and "apparatus comprising a processing device" may be used interchangeably with the data processing system 600 and include the above-listed exemplary embodiments.

It will be appreciated that additional components, not shown, may also be part of the system 600, and, in certain embodiments, fewer components than that shown in FIG. 6 may also be used in a data processing system 600. It will be apparent from this description that aspects of the inventions may be embodied, at least in part, in software. That is, the computer-implemented method 100 may be carried out in a computer system or other data processing system 505/510/600 in response to its processor or processing system 605 executing sequences of instructions contained in a memory, such as memory 610 or other non-transitory machine-readable storage medium. The software may further be transmitted or received over a network (not shown) via a network interface device 625. In various embodiments, hardwired circuitry may be used in combination with the software instructions to implement the present embodiments. Thus, the techniques are not limited to any specific combination of hardware circuitry and software, or to any particular source for the instructions executed by the data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
    receiving, by a computer, data describing a first software component used by a software product;
    receiving, by the computer, vulnerability data describing first and second vulnerabilities in the first software component;
    calculating, by the computer, a vulnerability score for the software product, based upon the vulnerability data for the first software component;
    receiving, by the computer, an updated status of the first and second vulnerabilities in the first software component, wherein receiving the updated status includes receiving an approved waiver of the first vulnerability in the first software component and wherein the updated status reflects that the second vulnerability has been remediated by patching or revising the software component or the software product;
    receiving, by the computer, an update indicating that a second software component is no longer used by the software product;
    recalculating, by the computer, the vulnerability score for the software product based upon the updated status of the first and second vulnerabilities and based upon the update that the second software component is no longer used by the software product; and
    presenting, by the computer, the recalculated vulnerability score for the software product to a display device to a user.

2. The computer-implemented method of claim 1, further comprising:
    assigning, by the computer, a task of remediation of the second vulnerability in the first software component to a user; and
    tracking a status of the assigned remediation.

3. The computer-implemented method of claim 1, further comprising:
    associating, by the computer, the first or second vulnerability in the first software component with a bug in the bug tracking software.

4. The computer-implemented method of claim 1, further comprising:
    mapping, by the computer, the first vulnerability in the first software component to a vulnerability identifier, the vulnerability identifier being part of the vulnerability data.

5. The computer-implemented method of claim 1, further comprising:
    presenting, by the computer, a recommended alternative to the first software component based upon the vulnerability data describing the first and second vulnerabilities in the first software component.

6. The computer-implemented method of claim 1, further comprising:
    generating, by the computer, a notification if the vulnerability score for the software product exceeds a threshold value.

7. The computer-implemented method of claim 1, further comprising:
    receiving, by the computer, input from the user to follow the software product; and
    presenting, by the computer, data for the software product to the user, including the vulnerability score for the software product, in response to a request from the user to view software products followed by the user.

8. A non-transitory computer-readable medium storing instructions, which when executed by a processing device, cause the processing device to perform method comprising:
    receiving, by a computer, data describing a first software component used by a software product;
    receiving, by the computer, vulnerability data describing first and second vulnerabilities in the first software component;
    calculating, by the computer, a vulnerability score for the software product, based upon the vulnerability data for the first software component;
    receiving, by the computer, an updated status of the first and second vulnerabilities in the first software component, wherein receiving the updated status includes receiving an approved waiver of the first vulnerability in the first software component and wherein the updated status reflects that the second vulnerability has been remediated by patching or revising the software component or the software product;
    receiving, by the computer, an update indicating that a second software component is no longer used by the software product;
    recalculating, by the computer, the vulnerability score for the software product based upon the updated status of the first and second vulnerabilities and based upon the update that the second software component is no longer used by the software product; and
    presenting, by the computer, the recalculated vulnerability score for the software product to a display device to a user.

9. The non-transitory computer-readable medium of claim 8, the method further comprising:
    assigning a task of remediation of the second vulnerability in the first software component to a user; and
    tracking a status of the assigned remediation.

10. The non-transitory computer-readable medium of claim 8, the method further comprising:
    associating the first or second vulnerability in the first software component with a bug in the bug tracking software.

11. The non-transitory computer-readable medium of claim 9, the method further comprising:
    mapping the first vulnerability in the first software component to a vulnerability identifier, the vulnerability identifier being part of the vulnerability data.

12. The non-transitory computer-readable medium of claim 9, the method further comprising:
    presenting a recommended alternative to the first software component based upon the vulnerability data describing the vulnerability in the first software component.

13. The non-transitory computer-readable medium of claim 9, the method further comprising:
    generating a notification if the vulnerability score for the software product exceeds a threshold value.

14. The non-transitory computer-readable medium of claim 9, the method further comprising:
- receiving input from the user to follow the software product; and
- presenting data for the software product to the user, including the vulnerability score for the software product, in response to a request from the user to view software products followed by the user.

15. An apparatus comprising:
- a processing device; and
- a memory coupled to the processing device, the memory storing instructions which, when executed by the processing device, cause the apparatus to:
  - receive data describing a software component used by a software product;
  - receive vulnerability data describing first and second vulnerabilities in the software component;
  - calculate a vulnerability score for the software product based upon the vulnerability data for the software component;
  - receive an updated status of the first and second vulnerabilities in the first software component, wherein receiving the updated status includes receiving an approved waiver of the first vulnerability in the first software component and wherein the updated status reflects that the second vulnerability has been remediated by patching or revising the software component or the software product;
  - receive an update indicating that a second software component is no longer used by the software product;
  - recalculate the vulnerability score for the software product based upon the updated status of the first and second vulnerabilities and based upon the update that the second software component is no longer used by the software product; and
  - present the recalculated vulnerability score for the software product to a display device to a user.

16. The apparatus of claim 15, wherein the execution of the instructions by the processing device further causes the apparatus to:
- assign a task of remediation of the second vulnerability in the first software component to a user; and
- track a status of the assigned remediation.

* * * * *